US012775847B2

(12) United States Patent
Kryscinski et al.

(10) Patent No.: US 12,775,847 B2
(45) Date of Patent: Oct. 27, 2026

(54) SYSTEMS AND METHODS FOR FACTUAL NATURAL LANGUAGE PROCESSING

(71) Applicant: Salesforce, Inc., San Francisco, CA (US)

(72) Inventors: Wojciech Kryscinski, Palo Alto, CA (US); Alexander R. Fabbri, New York, NY (US); Caiming Xiong, Menlo Park, CA (US); Shafiq Rayhan Joty, San Jose, CA (US); Chien-Sheng Wu, Mountain View, CA (US); Divyansh Agarwal, San Francisco, CA (US); Philippe Laban, New York, NY (US)

(73) Assignee: Salesforce, Inc., San Francisco, CA (US)

( * ) Notice: Subject to any disclaimer, the term of this patent is extended or adjusted under 35 U.S.C. 154(b) by 301 days.

(21) Appl. No.: 18/474,949

(22) Filed: Sep. 26, 2023

(65) Prior Publication Data

US 2024/0394539 A1 Nov. 28, 2024

Related U.S. Application Data

(60) Provisional application No. 63/503,701, filed on May 22, 2023.

(51) Int. Cl.

| | |
|---|---|
| ***G06N 3/084*** | (2023.01) |
| ***G06F 40/166*** | (2020.01) |
| ***G06F 40/40*** | (2020.01) |

(52) U.S. Cl.

CPC ........... *G06N 3/084* (2013.01); *G06F 40/166* (2020.01); *G06F 40/40* (2020.01)

(58) Field of Classification Search

None

See application file for complete search history.

(56) References Cited

U.S. PATENT DOCUMENTS

| | | | | |
|---|---|---|---|---|
| 10,019,525 | B1 * | 7/2018 | Boni | G06F 16/9038 |
| 2021/0124876 | A1 * | 4/2021 | Kryscinski | G06F 16/345 |
| 2024/0184988 | A1 * | 6/2024 | Sridhar | G06F 16/36 |

OTHER PUBLICATIONS

Du et al. "Constructing Contrastive Samples via Summarization for Text Classification with Limited Annotations", arXiv:2104.05094v3 [cs. CL] Nov. 29, 2021 (Year: 2021).*

Tanya Goyal, Junyi Jessy Li, and Greg Durrett. 2022. News summarization and evaluation in the era of gpt-3. arXiv preprint arXiv:2209.12356.

* cited by examiner

*Primary Examiner* — Nicole A K Schmieder

(74) *Attorney, Agent, or Firm* — Haynes and Boone, LLP

(57) ABSTRACT

Embodiments described herein provide systems and methods for training neural network based language models using human feedback. An existing (or generated) summary of a document is provided, and that summary may be used to generate a number of other summaries. A human annotator may reject the summary if there is any factuality issue with the summary. Summaries which are agreed to have no factuality problems are used as baseline summaries. Small atomic edits are made to the baseline summaries (e.g., replacing a single word or phrase) to create a group of summaries. Human annotators label each of these summaries as factual or not. The annotated summaries are used to train a summarization model and/or a factual detector model.

12 Claims, 7 Drawing Sheets

SYSTEMS AND METHODS FOR FACTUAL NATURAL LANGUAGE PROCESSING

CROSS REFERENCE(S)

The instant application is a nonprovisional of and claim priority under 35 U.S.C. 119 to U.S. provisional application No. 63/503,701, filed May 22, 2023, which is hereby expressly incorporated by reference herein in its entirety.

TECHNICAL FIELD

The embodiments relate generally to machine learning systems for natural language processing, and more specifically to factual summarization.

BACKGROUND

Machine learning systems have been widely used in natural language processing tasks such as generating a summary of a document. Existing summarization models exhibit non-factual outputs (e.g., summaries that may not be factual compared to the original source document, referred to as hallucinations) a significant portion of the time. It is desirable that language models increase their factuality so that the output may be trusted to a greater degree. Therefore, there is a need for systems and methods for factual natural language processing.

Figure 1:
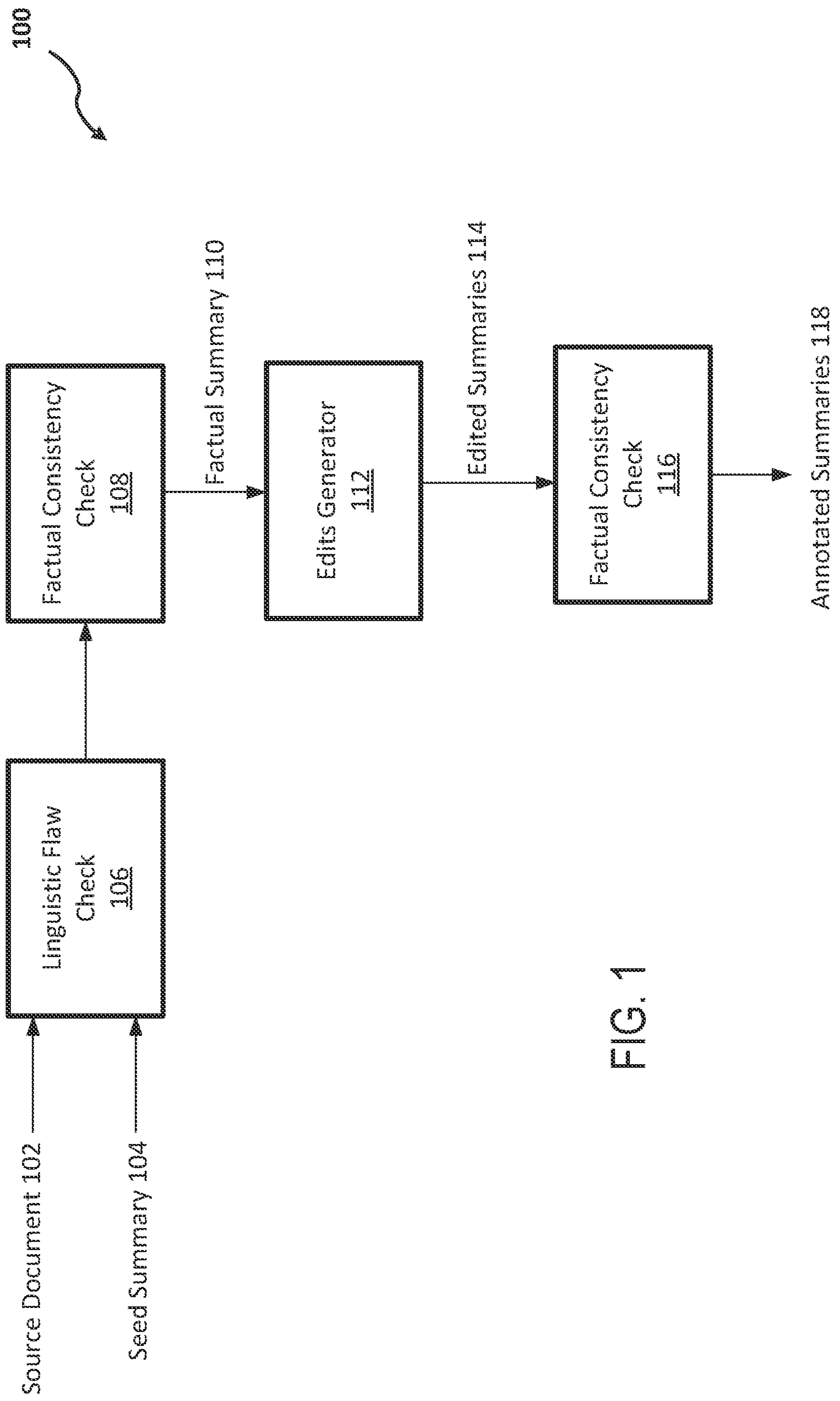
FIG. 1 is a simplified diagram illustrating a dataset generation framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Overview

Machine learning systems have been widely used in natural language processing tasks such as generating a summary of a document. Existing summarization models exhibit non-factual outputs (e.g., summaries that may not be factual compared to the original source document, referred to as hallucinations) a significant portion of the time. It is desirable that language models increase their factuality so that the output may be trusted to a greater degree. One difficulty in this is the availability of very high-quality factual training datasets for training a summarization model.

In view of the need for systems and methods for factual natural language processing, embodiments described herein provide a training framework for improving the factuality of language models. The training framework combines one or more neural network based language models trained by human feedback annotated training samples. For example, an existing (or generated by a summary model) summary of a document is provided, and that summary may be used to generate a number of variant summaries.

In one embodiment, the summary may be reviewed and rejected by a human annotator if there is any factuality issue with the summary. Multiple human annotators may be employed in this reviewing process, in which case all may need to agree that a summary is factual in order for it to not be rejected. Summaries which are agreed to have no factuality problems are used as baseline summaries. Small atomic edits are made to the baseline summaries (e.g., replacing a single word or phrase, negating an assertion, or swapping two words) to create a group of summaries. Human annotators label each of these summaries as factual or not. Since the summaries all relate to the same document, the human reader only needs to familiarize themselves with the one document. The nature of the atomic edits means that a human may quickly annotate many summaries. This results in a large high-quality dataset of labelled factual and non-factual summaries with an efficient human annotation process.

The generated dataset may be used directly to fine-tune a language model. For example, a model which generates summaries of input documents may be fine-tuned using the annotated factual and non-factual summaries. Specifically, the model may be updated to increase probability of producing a labeled factual summary, and decrease probability of producing a labeled non-factual summary.

Further, the generated dataset may be used to train a factuality detector model which detects the factuality of an output summary. Such a factuality detector model could also be used directly to inform a user of the factuality of a summary. A factuality detector model may also be used as a reward model in training or fine-tuning a summarization model to maximize the reward (output of the factuality detector).

Embodiments described herein provide a number of benefits. For example, the inclusion of human feedback in the annotation process may increase the quality of the dataset and therefore the quality of a model trained utilizing the dataset. The use of multiple atomic edits to an existing known-good summary allows for rapid creation of multiple high-quality annotated summaries, allowing for much larger datasets to be generated much faster than with other methods. This results in higher factuality of outputs by models, and/or the ability of a model to accurately detect the factuality of a summary. Therefore, with improved performance on factuality, neural network technology in natural language processing is improved.

FIG. 1 is a simplified diagram illustrating a dataset generation framework 100 according to some embodiments. A system implementing dataset generation framework may efficiently generate a large number of high quality annotated summaries 118 by utilizing human feedback, a paired source document 102 and associated seed summary 104. The source document 102 may be, for example, a pdf document, a website, a transcript, etc. The seed summary 104 may be a summary which is generated automatically by a neural network based model, or may be a human-written summary which is received via a data interface.

Framework 100 includes a linguistic flaw check 106 which takes a source document 102 and a seed summary 104 as inputs, and based on an indication received via a data interface based on a user interaction, either discards the seed summary 104 or passes seed summary 104 to factual consistency check 108. Linguistic flaw check 106 may prompt a user to indicate whether there are any linguistic flaws in the seed summary. For example, linguistic flaw check may be used to filter out seed summaries with grammatical errors, spelling errors, unclear statements, ambiguous statements, etc.

Factual consistency check 108 similarly is used to check seed summary 104 for errors based on human feedback via a data interface, but with respect to factual consistency with respect to source document 102. For example, factual consistency check may prompt a user to indicate whether a seed summary 104 is factually consistent with source document 102. If seed summary 104 is indicated to not be factually consistent, it may be discarded by factual consistency check 108. If seed summary 104 is indicated to be factually consistent, it may be passed to edits generator 112 as factual summary 110. In some embodiments, linguistic flaw check 106 and factual consistency check 108 may be performed by one or more neural network based language models rather than via human feedback.

Edits generator 112 receives factual summary 110 and generates edited summaries 114 based on factual summary 110 and may also base the edits on source document 102. In some embodiments, small atomic edits are made to the baseline summaries (e.g., replacing a single word or phrase) to create a group of summaries. Edits may be generated based on a rule, heuristic, or via a neural network based language model. Generating edited summaries 114 may include performing a number of different types of operations on factual summary 110. For example, one operation may be replacing a first word in the first summary with a second word. The first word may be replaced with a random second word, a synonym of the first word, an antonym of the first word, etc. Another operation may be negating an assertion in the first summary. For example, the assertion “There is a mouse in the cup” may be replaced with “There is not a mouse in the cup.” Another operation may be swapping two words in the first summary. For example, the phrase “My mom married my dad” may become “My dad married my mom.” Other types of operations/edits are possible and within the scope of this disclosure.

Edited summaries 114 may be shown to a user via a user interface and factual consistency check 116 may prompt a user to indicate the factual consistency of edited summaries 114 with respect to source document 102. Since each of the edited summaries is related to the same source document 102, a user would only need to familiarize themselves with one source document 102 to review many edited summaries 114. Further, since the edits are small atomic edits, a user may quickly determine factual consistency. This allows for efficient annotation of edited summaries 114. Based on the user feedback, factual consistency check 116 outputs annotated summaries 118 which include the edited summaries 114 and an annotation indicating whether they are factually consistent or inconsistent. Both consistent and inconsistent annotated summaries 118 may be used in training language models, for example as described in FIGS. 2 and 3A. In some embodiments, factual consistency check 116 may be performed by a neural network based language model.

Figure 2:
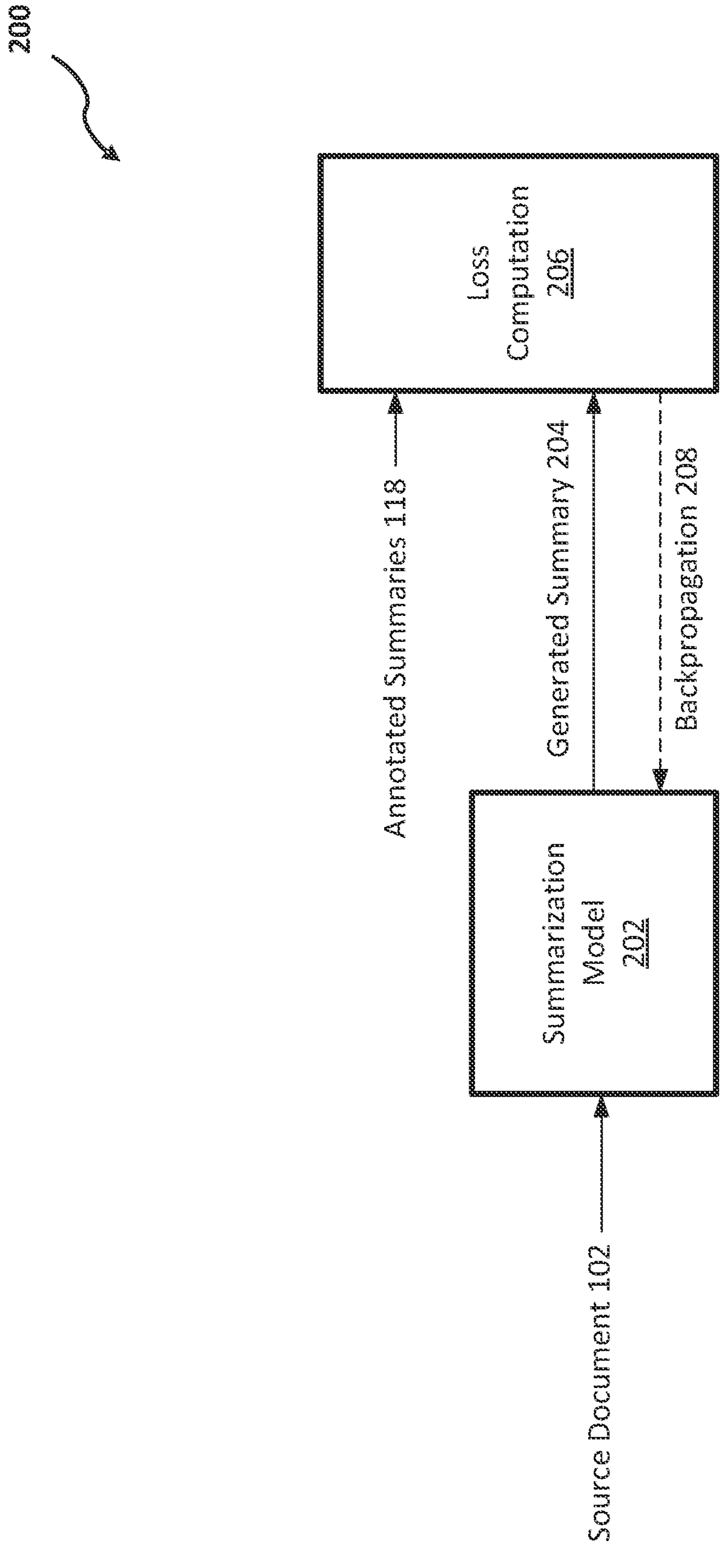
FIG. 2 is a simplified diagram illustrating a summarization model training framework according to some embodiments.

FIG. 2 is a simplified diagram illustrating a summarization model training framework 200 according to some embodiments. A system implementing framework 200 may train a summarization model 202 utilizing a source document 102 and annotated summaries 118 generated as described in FIG. 1. Summarization model 202 may be provided source document 102 and output a generated summary 204. Loss computation 206 may compute a loss based on a comparison of generated summary 204 to annotated summaries 118. Based on the computed loss, summarization model 202 may be updated via backpropagation 208 to minimize the computed loss.

In one embodiment, loss computation 206 may, for example, compute a cross-entropy loss, or a mean square error between the generated summary 204 and an annotated summary 118 when the associated label of the annotated summary 118 indicates the annotated summary is factual, e.g., using the annotated summary 118 as ground-truth.

In another embodiment, loss computation 206 may compute a contrastive loss. For example, an additional encoder may encode annotated summaries 118 and generated summary 204 to encoded representations in a latent space. The generated summary 204 and annotated summary 118 having a label indicating annotated summary 118 is factual may form a positive pair, and generated summary 204 and annotated summary 118 having a label indicating annotated summary 118 is not factual may form one or more negative pairs. In one implementation, a contrastive loss may be computed based on the positive pairs of encoded representations of (summary 204, annotated summary 118 having a label indicating annotated summary 118 is factual), and negative pairs of encoded representations of (summary 204, annotated summary 118 having a label indicating annotated summary 118 is not factual). Therefore, the contrastive loss may be used to update the summarization 202 via backpropagation. By minimizing the contrastive loss at backpropagation, summarization model 202 may be trained to generate summaries 204 that are close to factual summaries of source document 102 in the latent space while pushing away the encoded representations of non-factual summaries of source document 102 in the latent space.

Summarization model 202 may be used at inference to provide summaries of source documents that are highly factually consistent with the source documents.

Figures 3A, 3B:
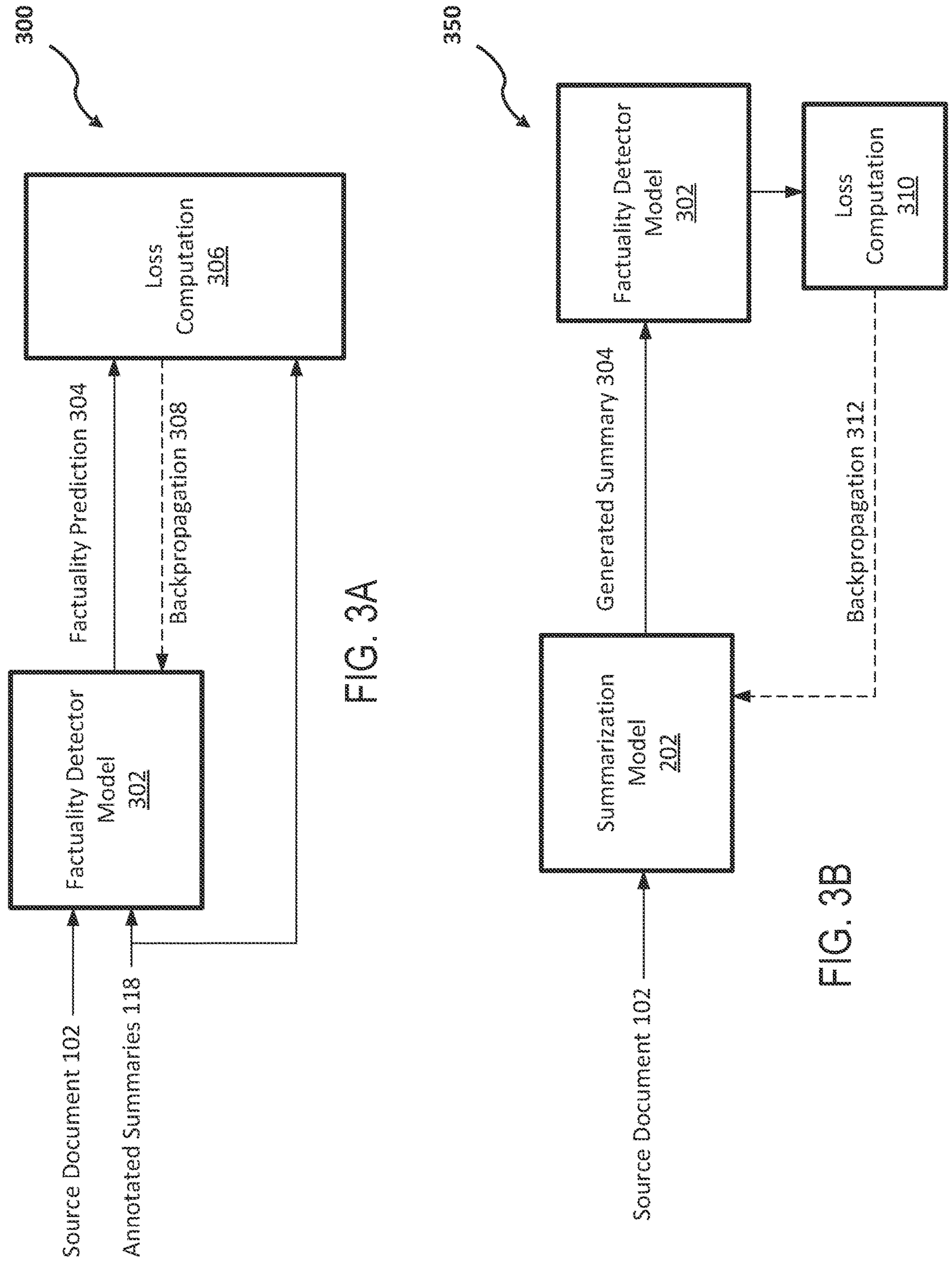
FIG. 3A is a simplified diagram illustrating a factuality detector model training framework according to some embodiments.
FIG. 3B is a simplified diagram illustrating a summarization model training framework utilizing a factuality detector model according to some embodiments.

FIG. 3A is a simplified diagram illustrating a factuality detector model training framework 300 according to some embodiments. A system implementing framework 300 may train a factuality detector model 302 using a source document 102 and annotated summaries 118 generated as described in FIG. 1. Factuality detector model 302 may be provided source document 102 and annotated summaries

118 (without the annotations) and output a factuality prediction 304. Factuality prediction may be, for example, a value between 0 and 1 which predicts factual consistency, with values closer to 1 representing more likely factually consistent. Loss computation 306 may compute a loss based on a comparison of factuality prediction 304 to the annotations of annotated summaries 118. Based on the computed loss, factuality detector model 302 may be updated via backpropagation 308 to minimize the computed loss. Loss computation 306 may, for example, generate a loss value that decreases as factuality prediction 304 approaches the associated annotation, and increases as factuality prediction 304 is further from the associated annotation. Factuality detector model 302 may be used at inference to provide factuality predictions of summaries with respect to documents they purport to summarize. For example, a user may provide a document and a summary, and factuality detector model 302 may cause a user interface to display a factuality prediction. Factuality detector model 302 may also be used in training a summarization model as described in FIG. 3B.

FIG. 3B is a simplified diagram illustrating a summarization model training framework 350 utilizing a factuality detector model according to some embodiments. A system implementing framework 350 may train a summarization model 202 utilizing a source document 102 and factuality detector model 302 trained as described in FIG. 3A. Effectively, the knowledge of the annotated summaries 118 are captured by factuality detector model 302, such that the annotated summaries themselves are not utilized directly in the training of summarization model 202. In some embodiment, summarization model 202 may be provided source document 102 and output a generated summary 304. Factuality detector model 302 may predict the factual consistency of generated summary 304 with respect to associated source document 102. The factuality prediction from factuality detector model 302 may be used to generate a loss (e.g., the inverse of the factuality prediction) via loss computation 310 which may be used to update summarization model 202 via backpropagation 312. Summarization model 202 may be used at inference to provide summaries of source documents that are highly factually consistent with the source documents.

Computer and Network Environment

Figure 4A:
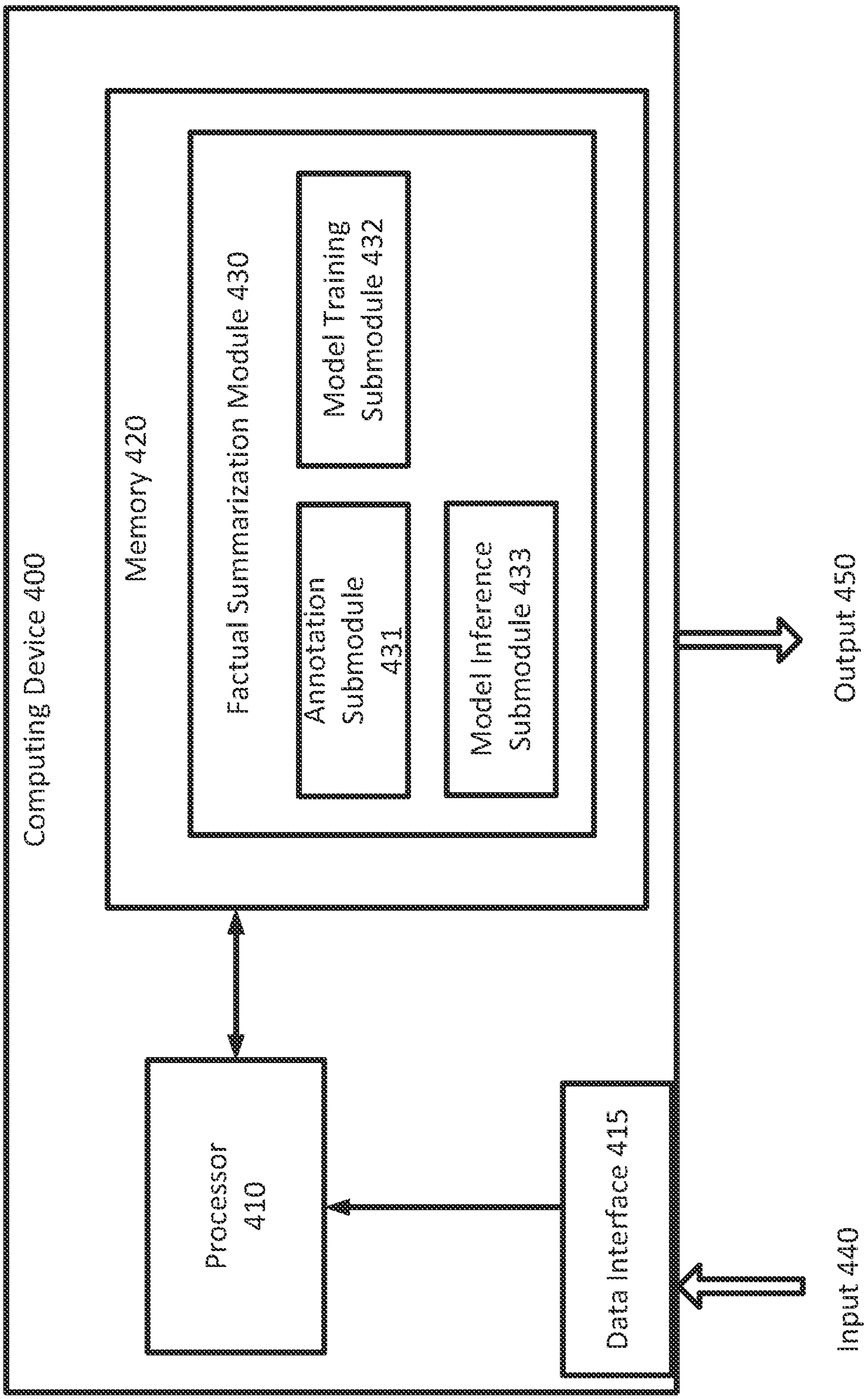
FIG. 4A is a simplified diagram illustrating a computing device implementing the frameworks described in FIGS. 1-3B, according to some embodiments.

FIG. 4A is a simplified diagram illustrating a computing device 400 implementing the frameworks described in FIGS. 1-3B, according to some embodiments. As shown in FIG. 4A, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for factual summarization module 430 that may be used to implement and/or emulate the systems and models, and/or to implement any of the methods described further herein. factual summarization module 430 may receive input 440 such as an input training data (e.g., source documents and seed summaries) via the data interface 415 and generate an output 450 which may be factual summaries.

The data interface 415 may comprise a communication interface, a user interface (such as a voice input interface, a graphical user interface, and/or the like). For example, the computing device 400 may receive the input 440 (such as a training dataset) from a networked database via a communication interface. Or the computing device 400 may receive the input 440, such as source documents, from a user via the user interface.

In some embodiments, the factual summarization module 430 is configured to generate annotated summaries, generate factual summaries given a source document, and/or predict the factuality of a summary (e.g., the consistency of the summary with respect to the source document). The factual summarization module 430 may further include annotation submodule 431 which may be configured to perform the actions embodied by framework 100 to generate annotated summaries. The factual summarization module 430 may further include model training submodule 432 which may be configured to perform the actions embodied by frameworks 200, 300, and/or 350 to train a factual summarization model and/or a factuality detector model. The factual summarization module 430 may further include model inference submodule 433 which may be configured to use trained models to perform a task at inference. For example, model inference submodule 433 may be configured to generate a summary when provided a source document. In another example, model inference submodule 433 may be configured to predict a factuality metric of a given summary based on a source document.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 4B:
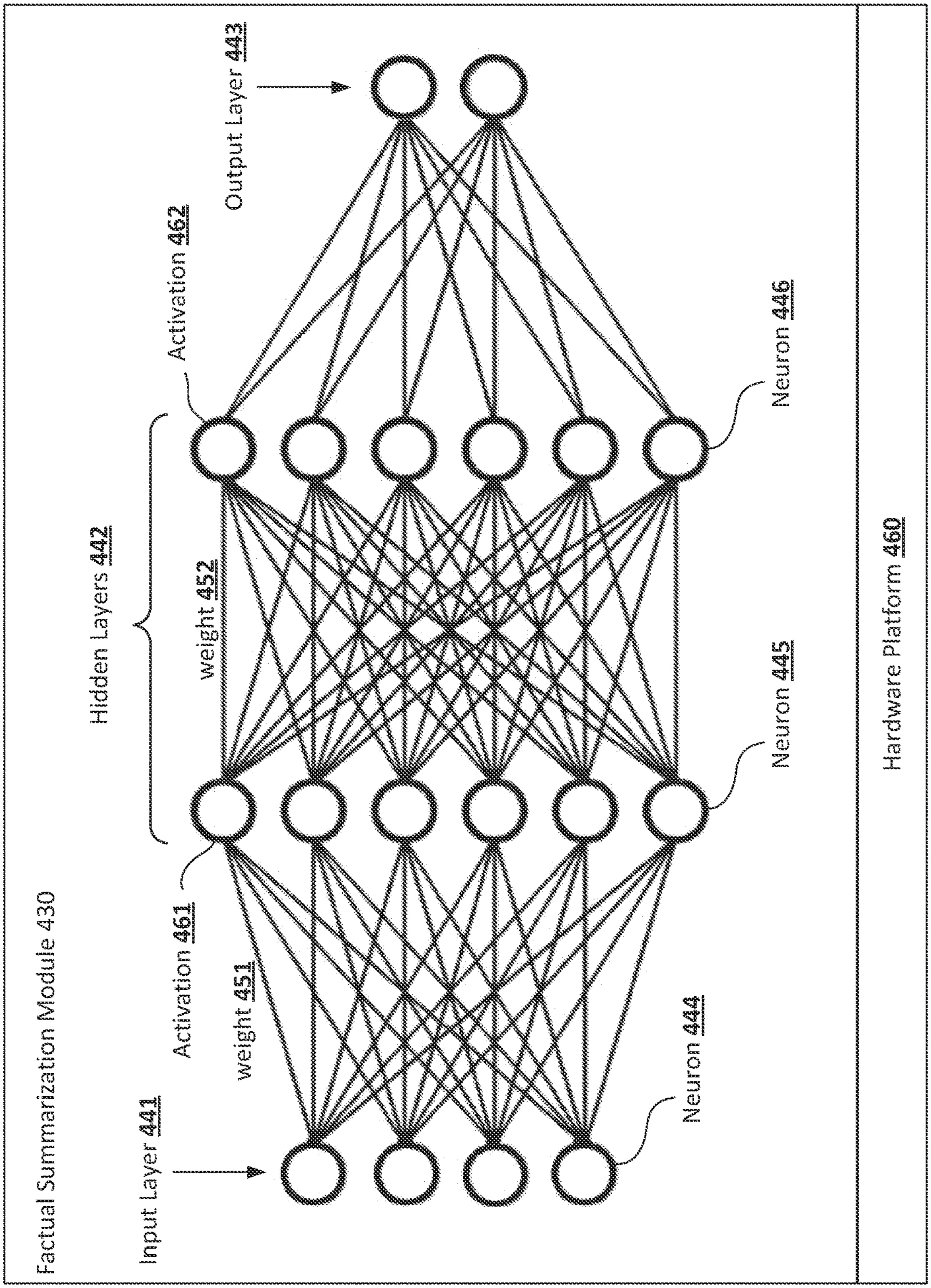
FIG. 4B is a simplified diagram illustrating a neural network structure, according to some embodiments.

FIG. 4B is a simplified diagram illustrating the neural network structure implementing the factual summarization module 430 described in FIG. 4A, according to some embodiments. In some embodiments, the factual summarization module 430 and/or one or more of its submodules 431-433 may be implemented at least partially via an artificial neural network structure shown in FIG. 4B. The neural network comprises a computing system that is built on a collection of connected units or nodes, referred to as neurons (e.g., 444, 445, 446). Neurons are often connected by edges, and an adjustable weight (e.g., 451, 452) is often associated with the edge. The neurons are often aggregated into layers such that different layers may perform different transformations on the respective input and output transformed input data onto the next layer.

For example, the neural network architecture may comprise an input layer 441, one or more hidden layers 442 and an output layer 443. Each layer may comprise a plurality of neurons, and neurons between layers are interconnected according to a specific topology of the neural network topology. The input layer 441 receives the input data (e.g., 440 in FIG. 4A), such as a source document 102. The number of nodes (neurons) in the input layer 441 may be determined by the dimensionality of the input data (e.g., the length of a vector of the source document. Each node in the input layer represents a feature or attribute of the input.

The hidden layers 442 are intermediate layers between the input and output layers of a neural network. It is noted that two hidden layers 442 are shown in FIG. 4B for illustrative purpose only, and any number of hidden layers may be utilized in a neural network structure. Hidden layers 442 may extract and transform the input data through a series of weighted computations and activation functions.

For example, as discussed in FIG. 4A, the factual summarization module 430 receives an input 440 of a source document 102 and transforms the input into an output 450 of a summary. To perform the transformation, each neuron receives input signals, performs a weighted sum of the inputs according to weights assigned to each connection (e.g., 451, 452), and then applies an activation function (e.g., 461, 462, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 441 is transformed into rather different values indicative data characteristics corresponding to a task that the neural network structure has been designed to perform.

The output layer 443 is the final layer of the neural network structure. It produces the network's output or prediction based on the computations performed in the preceding layers (e.g., 441, 442). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the factual summarization module 430 and/or one or more of its submodules 431-433 may comprise the transformative neural network structure of layers of neurons, and weights and activation functions describing the non-linear transformation at each neuron. Such a neural network structure is often implemented on one or more hardware processors 410, such as a graphics processing unit (GPU). An example neural network may be a large language model, and/or the like.

In one embodiment, the factual summarization module 430 and its submodules 431-433 may be implemented by hardware, software and/or a combination thereof. For example, the factual summarization module 430 and its submodules 431-433 may comprise a specific neural network structure implemented and run on various hardware platforms 460, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 460 used to implement the neural network structure is specifically configured based on factors such as the complexity of the neural network, the scale of the tasks (e.g., training time, input data scale, size of training dataset, etc.), and the desired performance.

In one embodiment, the neural network based factual summarization module 430 and one or more of its submodules 431-433 may be trained by iteratively updating the underlying parameters (e.g., weights 451, 452, etc., bias parameters and/or coefficients in the activation functions 461, 462 associated with neurons) of the neural network based on a loss such as in loss computation 206 or loss computation 306. For example, during forward propagation, the training data such as source documents are fed into the neural network. The data flows through the network's layers 441, 442, with each layer performing computations based on its weights, biases, and activation functions until the output layer 443 produces the network's output 450. In some embodiments, output layer 443 produces an intermediate output on which the network's output 450 is based.

The output generated by the output layer 443 is compared to the expected output (e.g., a "ground-truth" such as the corresponding known-good summary from the training data, to compute a loss function that measures the discrepancy between the predicted output and the expected output. For example, the loss function may be a cross entropy loss function. Given the loss, the negative gradient of the loss function is computed with respect to each weight of each layer individually. Such negative gradient is computed one layer at a time, iteratively backward from the last layer 443 to the input layer 441 of the neural network. These gradients quantify the sensitivity of the network's output to changes in the parameters. The chain rule of calculus is applied to efficiently calculate these gradients by propagating the gradients backward from the output layer 443 to the input layer 441.

Parameters of the neural network are updated backwardly from the last layer to the input layer (backpropagating) based on the computed negative gradient using an optimization algorithm to minimize the loss. The backpropagation from the last layer 443 to the input layer 441 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as unseen source documents.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network thus improves neural network technology in natural language processing.

Figure 5:
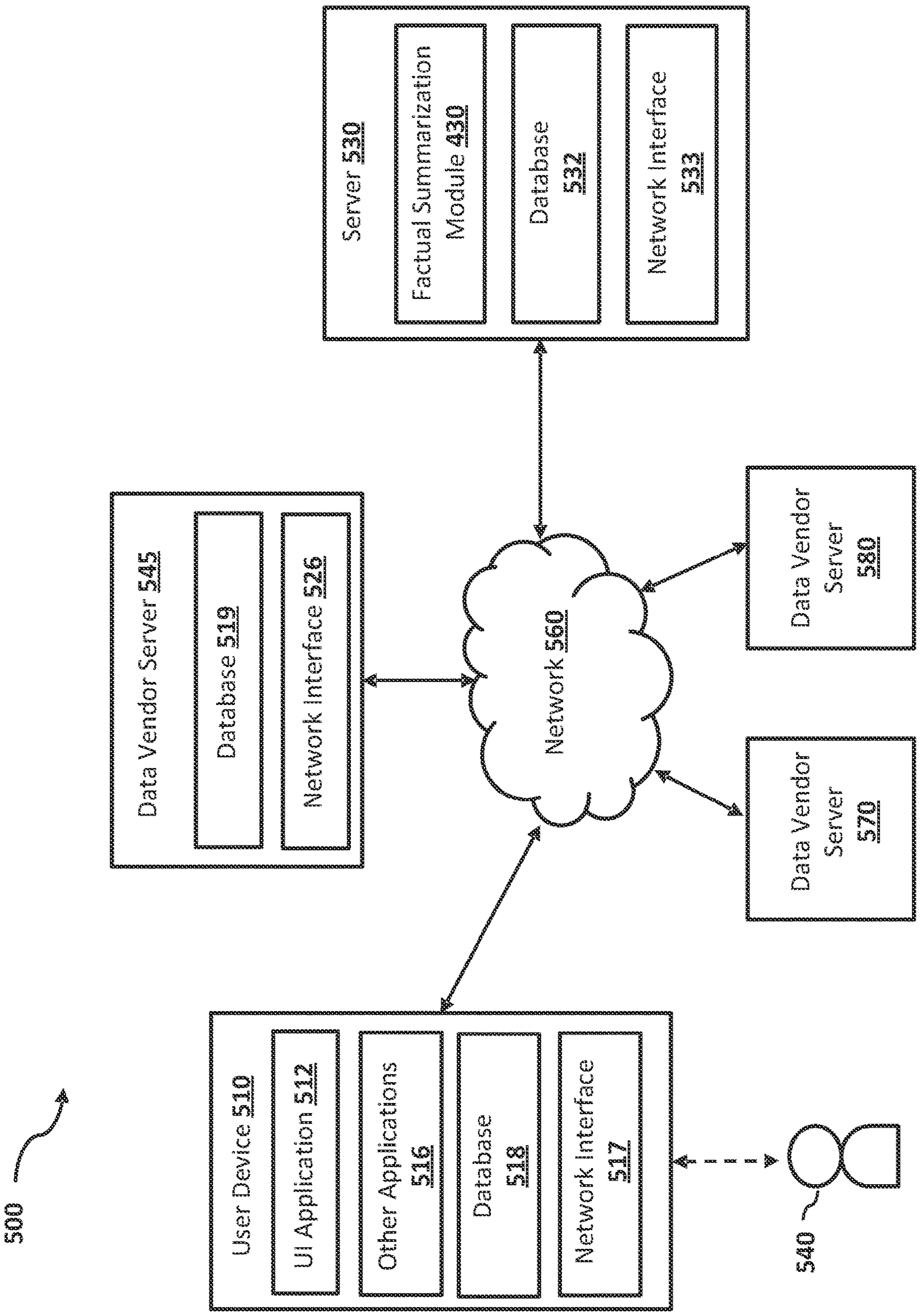
FIG. 5 is a simplified block diagram of a networked system suitable for implementing the frameworks described in FIGS. 1-4B and other embodiments described herein.

FIG. 5 is a simplified block diagram of a networked system 500 suitable for implementing the frameworks described in FIGS. 1-4B and other embodiments described herein.

In one embodiment, system 500 includes the user device 510 which may be operated by user 540, data vendor servers 545, 570 and 580, server 530, and other forms of devices, servers, and/or software components that operate to perform various methodologies in accordance with the described embodiments. Exemplary devices and servers may include device, stand-alone, and enterprise-class servers which may be similar to the computing device 400 described in FIG. 4A, operating an OS such as a MICROSOFT® OS, a UNIX® OS, a LINUX® OS, or other suitable device and/or server-based OS. It can be appreciated that the devices and/or servers illustrated in FIG. 5 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 510, data vendor servers 545, 570 and 580, and the server 530 may communicate with each other over a network 560. User device 510 may be utilized by a user 540 (e.g., a driver, a system admin, etc.) to access the various features available for user device 510, which may include processes and/or applications associated with the server 530 to receive an output data anomaly report.

User device 510, data vendor server 545, and the server 530 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 500, and/or accessible over network 560.

User device 510 may be implemented as a communication device that may utilize appropriate hardware and software configured for wired and/or wireless communication with data vendor server 545 and/or the server 530. For example, in one embodiment, user device 510 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLER. Although only one communication device is shown, a plurality of communication devices may function similarly.

User device 510 of FIG. 5 contains a user interface (UI) application 512, and/or other applications 516, which may correspond to executable processes, procedures, and/or applications with associated hardware. For example, the user device 510 may receive a message indicating a document summary from the server 530 and display the message via the UI application 512. In other embodiments, user device 510 may include additional or different modules having specialized hardware and/or software as required.

In various embodiments, user device 510 includes other applications 516 as may be desired in particular embodiments to provide features to user device 510. For example, other applications 516 may include security applications for implementing client-side security features, programmatic client applications for interfacing with appropriate application programming interfaces (APIs) over network 560, or other types of applications. Other applications 516 may also include communication applications, such as email, texting, voice, social networking, and IM applications that allow a user to send and receive emails, calls, texts, and other notifications through network 560. For example, the other application 516 may be an email or instant messaging application that receives a prediction result message from the server 530. Other applications 516 may include device interfaces and other display modules that may receive input and/or output information. For example, other applications 516 may contain software programs for asset management, executable by a processor, including a graphical user interface (GUI) configured to provide an interface to the user 540 to view summaries and/or indications of factuality.

User device 510 may further include database 518 stored in a transitory and/or non-transitory memory of user device 510, which may store various applications and data and be utilized during execution of various modules of user device 510. Database 518 may store user profile relating to the user 540, predictions previously viewed or saved by the user 540, historical data received from the server 530, and/or the like. In some embodiments, database 518 may be local to user device 510. However, in other embodiments, database 518 may be external to user device 510 and accessible by user device 510, including cloud storage systems and/or databases that are accessible over network 560.

User device 510 includes at least one network interface component 517 adapted to communicate with data vendor server 545 and/or the server 530. In various embodiments, network interface component 517 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 545 may correspond to a server that hosts database 519 to provide training datasets including source documents and/or seed summaries to the server 530. The database 519 may be implemented by one or more relational database, distributed databases, cloud databases, and/or the like.

The data vendor server 545 includes at least one network interface component 526 adapted to communicate with user device 510 and/or the server 530. In various embodiments, network interface component 526 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 545 may send asset information from the database 519, via the network interface 526, to the server 530.

The server 530 may be housed with the factual summarization module 430 and its submodules described in FIG. 4A. In some implementations, factual summarization module 430 may receive data from database 519 at the data vendor server 545 via the network 560 to generate summaries or factuality indications. The generated summaries or factuality indications may also be sent to the user device 510 for review by the user 540 via the network 560.

The database 532 may be stored in a transitory and/or non-transitory memory of the server 530. In one implementation, the database 532 may store data obtained from the data vendor server 545. In one implementation, the database 532 may store parameters of the factual summarization module 430. In one implementation, the database 532 may store previously generated summaries or factuality indications, and the corresponding input feature vectors.

In some embodiments, database 532 may be local to the server 530. However, in other embodiments, database 532 may be external to the server 530 and accessible by the server 530, including cloud storage systems and/or databases that are accessible over network 560.

The server 530 includes at least one network interface component 533 adapted to communicate with user device 510 and/or data vendor servers 545, 570 or 580 over network 560. In various embodiments, network interface component 533 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 560 may be implemented as a single network or a combination of multiple networks. For example, in various embodiments, network 560 may include the Internet or one or more intranets, landline networks, wireless networks, and/or other appropriate types of networks. Thus, network 560 may correspond to small scale communication networks, such as a private or local area network, or a larger scale network, such as a wide area network or the Internet, accessible by the various components of system 500.

Example Work Flows

Figure 6:
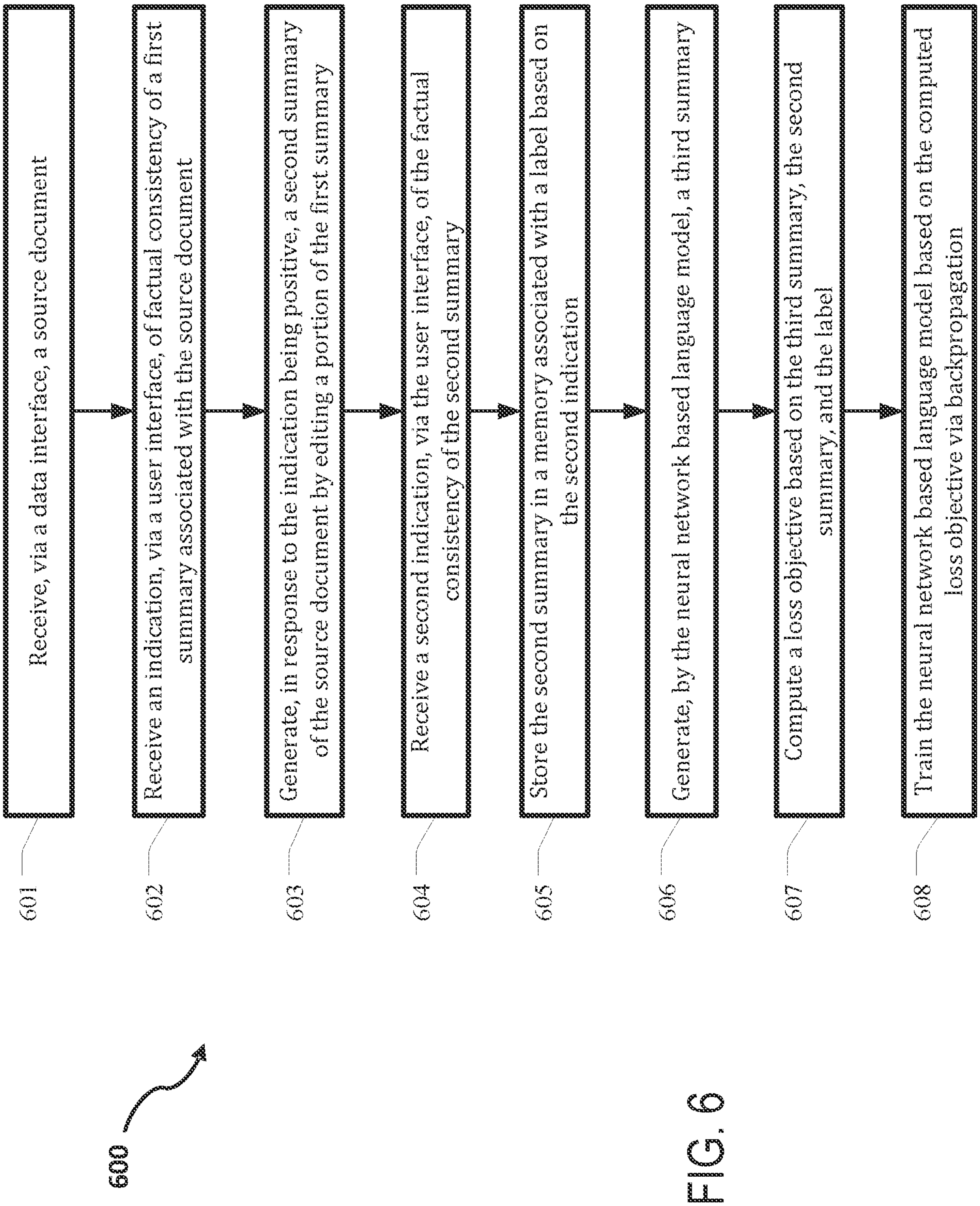
FIG. 6 is an example logic flow diagram illustrating a method of training a neural network based language model based on the frameworks shown in FIGS. 1-5, according to some embodiments.

FIG. 6 is an example logic flow diagram illustrating a method of training a neural network based language model (e.g., summarization model 202 or factuality detector model 302) based on the framework shown in FIGS. 1-5, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the factual summarization module 430 (e.g., FIGS. 4A and 5) that performs data annotation, training, and inference of neural network based language models.

As illustrated, the method 600 includes a number of enumerated steps, but aspects of the method 600 may include additional steps before, after, and in between the enumerated steps. In some aspects, one or more of the enumerated steps may be omitted or performed in a different order. Note that while operations are described as being performed on a single source document, etc. the steps described herein may be performed iteratively with multiple inputs and outputs which may be used in batches.

At step 601, a system receives, via a data interface (e.g., data interface 415), a source document (e.g., source document 102). The source document may be, for example, a pdf document, a website, a transcript, etc. The data interface may include physical connections and/or software components for transmitting data between software components.

At step 602, the system receives an indication, via a user interface (e.g., user device 510), of factual consistency of a first summary associated with the source document. In some embodiments, the system may also receive a second indication, via the user interface, of linguistic quality of the first summary associated with the source document, wherein the receiving the indication of factual consistency is predicated on the second indication. For example, summaries which are indicated to have linguistic problems may be discarded, and not used as seed summaries.

At step 603, the system generates, in response to the indication being positive, a second summary (e.g., edited summaries 114) of the source document by editing a portion of the first summary. Generating the second summary may include performing one of a number of different types of operations on the first summary in order to create a small "atomic" edit. For example, one operation may be replacing a first word in the first summary with a second word. The first word may be replaced with a random second word, a synonym of the first word, an antonym of the first word, etc. Another operation may be negating an assertion in the first summary. For example, the assertion "There is a mouse in the cup" may be replaced with "There is not a mouse in the cup." Another operation may be swapping two words in the first summary. For example, the phrase "My mom married my dad" may become "My dad married my mom." Other types of operations/edits are possible and within the scope of this disclosure.

At step 604, the system receives a second indication, via the user interface, of the factual consistency of the second summary (e.g., factual consistency check 116).

At step 605, the system stores the second summary in a memory associated with a label based on the second indication (e.g., annotated summaries 118). For example, if the second indication is that the summary is factually consistent, it may have one label, and if the second indication is that the summary is not factually consistent it may have a different label.

At step 606, the system generates, by the neural network based language model, a third summary (e.g., generated summary 204 or generated summary 310).

At step 607, the system computes a loss objective based on the third summary, the second summary, and the label. In some embodiments, computing the loss objective includes computing a distance in a representation space between the second summary and the third summary. For example, the loss objective may be to decrease the distance in representation space between a generated summary and summaries which are annotated as being factual, while distancing the summary in the representations space from summaries which are annotated as not being factual. The value of the loss therefore may be computed based on the distance in representation space and the corresponding annotation label of the annotated summary the generated summary is being compared to. In some embodiments, a loss computation is performed using a factuality detector model, which may be trained as described herein (e.g., based on the second summary and the label). The loss function may be the learned function of the factuality detector model itself, or some modification of said function. Using the factuality detector model may include inputting the third summary to the factuality detector model.

At step 608, the system trains the neural network based language model based on the computed loss objective via backpropagation.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of training a neural network based language model, the method comprising:

receiving, via a data interface, a source document and a first summary associated with the source document;

displaying the source document and the first summary to a user via a user interface;

receiving a first indication, from a user via the user interface, of factual consistency of the first summary;

generating, by an edits generator, in response to the first indication being positive, a second summary of the source document by editing a portion of the first summary by at least one of:

replacing a single word of the first summary, negating an assertion of the first summary, or swapping multiple words of the first summary;

receiving a second indication, from the user via the user interface, of the factual consistency of the second summary;

storing the second summary in a memory associated with a label based on the second indication;

generating, by the neural network based language model, a third summary using an input of the source document;

computing a contrastive loss objective by computing a distance in a representation space between the second summary and the third summary, wherein the third summary is used as a positive sample or a negative sample according to the label by using the third summary as the positive sample in response to the label indicating the second summary is factually consistent with the source document, using the third summary as the negative sample in response to the label indicating the second summary is not factually consistent with the source document, and inputting the third summary to a factuality detector model, wherein the contrastive loss objective is based on an output of the factuality detector model;

training the neural network based language model based on the computed contrastive loss objective via backpropagation to maximize the output of the factuality detector model;

receiving, via the data interface, a second source document; and generating, by the trained neural network based language model, a fourth summary of the second source document, wherein the fourth summary is factually consistent with the second source document.

2. The method of claim 1, wherein the computing the contrastive loss objective includes computing a value proportional to the distance.

3. The method of claim 1, wherein the factuality detector model is trained by predicting a factuality of the second summary and comparing the predicted factuality with the label associated with the second summary.

4. The method of claim 1, further comprising:

receiving a third indication, via the user interface, of linguistic quality of the first summary associated with the source document, wherein the receiving the first indication of factual consistency is in response to the third indication.

5. A system for training a neural network based language model, the system comprising:

a memory that stores the neural network based language model and a plurality of processor-executable instructions;

a communication interface that receives a source document and a first summary associated with the source document; and one or more hardware processors that read and execute the plurality of processor-executable instructions from the memory to perform operations comprising:

displaying the source document and the first summary to a user via a user interface;

receiving a first indication, from a user via the user interface, of factual consistency of the first summary;

generating, by an edits generator, in response to the first indication being positive, a second summary of the source document by editing a portion of the first summary by at least one of:

replacing a single word of the first summary, negating an assertion of the first summary, or swapping multiple words of the first summary;

receiving a second indication, from the user via the user interface, of the factual consistency of the second summary;

storing the second summary in a memory associated with a label based on the second indication;

generating, by the neural network based language model, a third summary using an input of the source document;

computing a contrastive loss objective by computing a distance in a representation space between the second summary and the third summary, wherein the third summary is used as a positive sample or a negative sample according to the label by:

using the third summary as the positive sample in response to the label indicating the second summary is factually consistent with the source document, using the third summary as the negative sample in response to the label indicating the second summary is not factually consistent with the source document, and inputting the third summary to a factuality detector model, wherein the contrastive loss objective is based on an output of the factuality detector model;

training the neural network based language model based on the computed contrastive loss objective via backpropagation to maximize the output of the factuality detector model;

receiving, via the communication interface, a second source document; and generating, by the trained neural network based language model, a fourth summary of the second source document, wherein the fourth summary is factually consistent with the second source document.

6. The system of claim 5, wherein the computing the contrastive loss objective includes computing a value proportional to the distance.

7. The system of claim 5, wherein the factuality detector model is trained by predicting a factuality of the second summary and comparing the predicted factuality with the label associated with the second summary.

8. The system of claim 5, further comprising:

receiving a third indication, via the user interface, of linguistic quality of the first summary associated with the source document, wherein the receiving the first indication of factual consistency is in response to the third indication.

9. A non-transitory machine-readable medium comprising a plurality of machine-executable instructions which, when executed by one or more processors, are adapted to cause the one or more processors to perform operations comprising:

receiving, via a data interface, a source document and a first summary associated with the source document;

displaying the source document and the first summary to a user via a user interface;

receiving a first indication, from a user via the user interface, of factual consistency of the first summary;

generating, by an edits generator, in response to the first indication being positive, a second summary of the source document by editing a portion of the first summary by at least one of:

replacing a single word of the first summary, negating an assertion of the first summary, or swapping multiple words of the first summary;

receiving a second indication, from the user via the user interface, of the factual consistency of the second summary;

storing the second summary in a memory associated with a label based on the second indication;

generating, by a neural network based language model, a third summary using an input of the source document;

computing a contrastive loss objective by computing a distance in a representation space between the second summary and the third summary, wherein the third summary is used as a positive sample or a negative sample according to the label by:

using the third summary as the positive sample in response to the label indicating the second summary is factually consistent with the source document, using the third summary as the negative sample in response to the label indicating the second summary is not factually consistent with the source document, and inputting the third summary to a factuality detector model, wherein the contrastive loss objective is based on an output of the factuality detector model;

training the neural network based language model based on the computed contrastive loss objective via backpropagation to maximize the output of the factuality detector model;

receiving, via the data interface, a second source document; and generating, by the trained neural network based language model, a fourth summary of the second source document, wherein the fourth summary is factually consistent with the second source document.

10. The non-transitory machine-readable medium of claim 9, wherein the computing the contrastive loss objective includes computing a value proportional to the distance.

11. The non-transitory machine-readable medium of claim 9, wherein the factuality detector model is trained by predicting a factuality of the second summary and comparing the predicted factuality with the label associated with the second summary.

12. The non-transitory machine-readable medium of claim 9, further comprising:

receiving a third indication, via the user interface, of linguistic quality of the first summary associated with the source document, wherein the receiving the first indication of factual consistency is in response to the third indication.

* * * * *